Patented Nov. 13, 1951

2,574,457

UNITED STATES PATENT OFFICE 2,574,457

MANUFACTURE OF ALKYL SULFENYL TRITHIOCARBONATES

Philip M. Arnold, Bartlesville, Okla., assignor to Phillips Petroleum Company, a corporation of Delaware No Drawing. Application August 5, 1947, Serial No. 766,438

9 Claims. (Cl. 260—607)

1

The present invention relates to a new class or organic sulfur compounds and their method of manufacture, and more particularly to novel compounds having the general formula

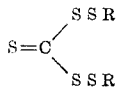

in which R is an alkyl group. The new compounds are the alkyl sulfenyl trithiocarbonates, and are derivatives of trithiocarbonic acid, $H_2CS_3$, in which the hydrogen atoms have been replaced by the alkyl sulfenyl groups, RS—.

The new compounds of the present invention may be prepared by the reaction of an alkali trithiocarbonate with an alkyl sulfenyl halide in accordance with the equation

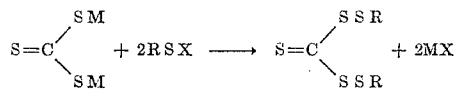

where M is sodium or other alkali metal, R is an alkyl radical, and X is chlorine or other halogen. The reaction may be carried out at room temperature or at somewhat higher temperatures, preferably in the presence of a suitable inert solvent such as a paraffin hydrocarbon. In general, it is preferred that R be an alkyl radical having from 1 to 12 carbon atoms to the molecule, in order to give products having a preferred chain length and molecular weight.

The alkyl sulfenyl halides are readily prepared by halogenation of an alkyl mercaptan, care being taken to avoid simultaneous halogenation of the alkyl group. The alkali trithiocarbonates are prepared by the reaction of an alkali metal sulfide with carbon disulfide.

The new compounds in question are of particular interest as lubricating oil additives, rubber vulcanization agents, and as flotation agents in the separation of ores.

The following example is a specific illustration of the process, but the procedure described therein may be considered as exemplary of that applicable to the preparation of the other members of the class described.

A solution of two gram mols of tertiary-butyl sulfenyl chloride in n-pentane was added to a stirred reaction mixture consisting of one gram mol of sodium trithiocarbonate in fifty percent aqueous solution, admixed with an equal volume of n-pentane. The mixture was maintained at reflux temperature (40° C.) for a period of 15 minutes. After reaction was completed, the pentane solution was recovered, washed, dried and depentanized under vacuum.

2

A crude reaction product representing an 89 percent yield by weight, in the form of a light red oil, was recoverd. This product was composed primarily of di-tertiary-butylsulfenyl trithiocarbonate and had the following characteristics:

Per cent sulfur, calculated for $C_9H_{18}S_5$ _____ 55.94
Per cent sulfur, found _____ 54.09
$n_D^{20}$ _____ 1.6012
$D_{20}^{20}$ _____ 1.111

Distillation of this sample at 1–2 mm. effected removal of di-tertiary-butyl disulfide and di-tertiary-butyl trisulfide from the di-tertiary-butylsulfenyl trithiocarbonate and the product then had the following characteristics:

$n_D^{20}$ ----------------------------------- 1.6005
Percent sulfur:
    Calculated for $C_9H_{18}S_5$ ------------- 55.94
    Found --------------------------- 54.95
Percent carbon:
    Calculated ----------------------- 37.77
    Found ---------------------------- 39.56
Percent hydrogen:
    Calculated ----------------------- 6.29
    Found ---------------------------- 6.24
Total:
    Calculated ----------------------- 100.00
    Found ---------------------------- 100.75

The slight deviation from the calculated composition was attributed to the presence of small amounts of di-tertiary-butyl disulfide and di-tertiary-butyl trisulfide.

In a similar manner, other alkyl sulfenyl trithiocarbonates may be prepared by the reaction of sodium trithiocarbonate with other alkyl sulfenyl chlorides such as the methyl, ethyl, propyl, butyl, pentyl, hexyl, heptyl, etc., sulfenyl chlorides. Since the lower sulfenyl chlorides are more reactive, particularly those having 1 to 3 carbon atoms, it is desirable to use an anhydrous reaction medium and avoid the presence of water in the reaction mixture. Other alkali metal salts such as potassium, and other halides such as the fluoride and bromide may be used instead of the sodium salt and the chloride, respectively.

I claim:

1. An alkyl sulfenyl trithiocarbonate having the general formula

wherein R is a tertiary alkyl radical having no more than 12 carbon atoms.

2. Di-tertiary-butylsulfenyl trithiocarbonate.

3. The process which comprises interacting an alkali metal trithiocarbonate with an alkyl sulfenyl halide wherein the alkyl group contains no more than 12 carbon atoms to form an alkyl sulfenyl trithiocarbonate.

4. A process according to claim 3 wherein the alkali metal is sodium.

5. A process according to claim 3 wherein the alkali metal is sodium and the halide is the chloride.

6. A process according to claim 3 wherein the alkyl sulfenyl chloride is tertiary-butylsulfenyl chloride.

7. The process which comprises interacting an alkali metal trithiocarbonate with an alkyl sulfenyl halide wherein the alkyl group contains no more than 12 carbon atoms in the presence of an inert solvent to form an alkyl sulfenyl trithiocarbonate.

8. A process according to claim 7 wherein the reaction is carried out in the presence of a paraffin hydrocarbon solvent.

9. A process according to claim 3 wherein the halide is the chloride.

PHILIP M. ARNOLD.

REFERENCES CITED

The following references are of record in the file of this patent:

UNITED STATES PATENTS

| Number | Name | Date |
|---|---|---|
| 2,021,726 | Hess | Nov. 19, 1935 |
| 2,123,082 | Schulze | July 5, 1938 |
| 2,250,545 | Mikeska et al. | July 29, 1941 |
| 2,390,713 | Hunt | Dec. 11, 1945 |
| 2,403,709 | Dickey et al. | July 9, 1946 |
| 2,415,971 | Stevens | Feb. 18, 1947 |
| 2,445,142 | Himel | July 13, 1948 |
| 2,458,075 | Himel | Jan. 4, 1949 |

OTHER REFERENCES

Rheinboldt et al.: "Ber. Deutsch. Chem. Ges.," vol. 72 (1939), pages 657 to 659.

Milas et al.: "Jour. Am. Chem. Soc.," vol. 68 (1946), pages 642 and 643 (two articles).